April 12, 1927. W. W. HARWOOD ET AL 1,624,240
INSECT DESTROYER
Filed May 22, 1925 2 Sheets-Sheet 1
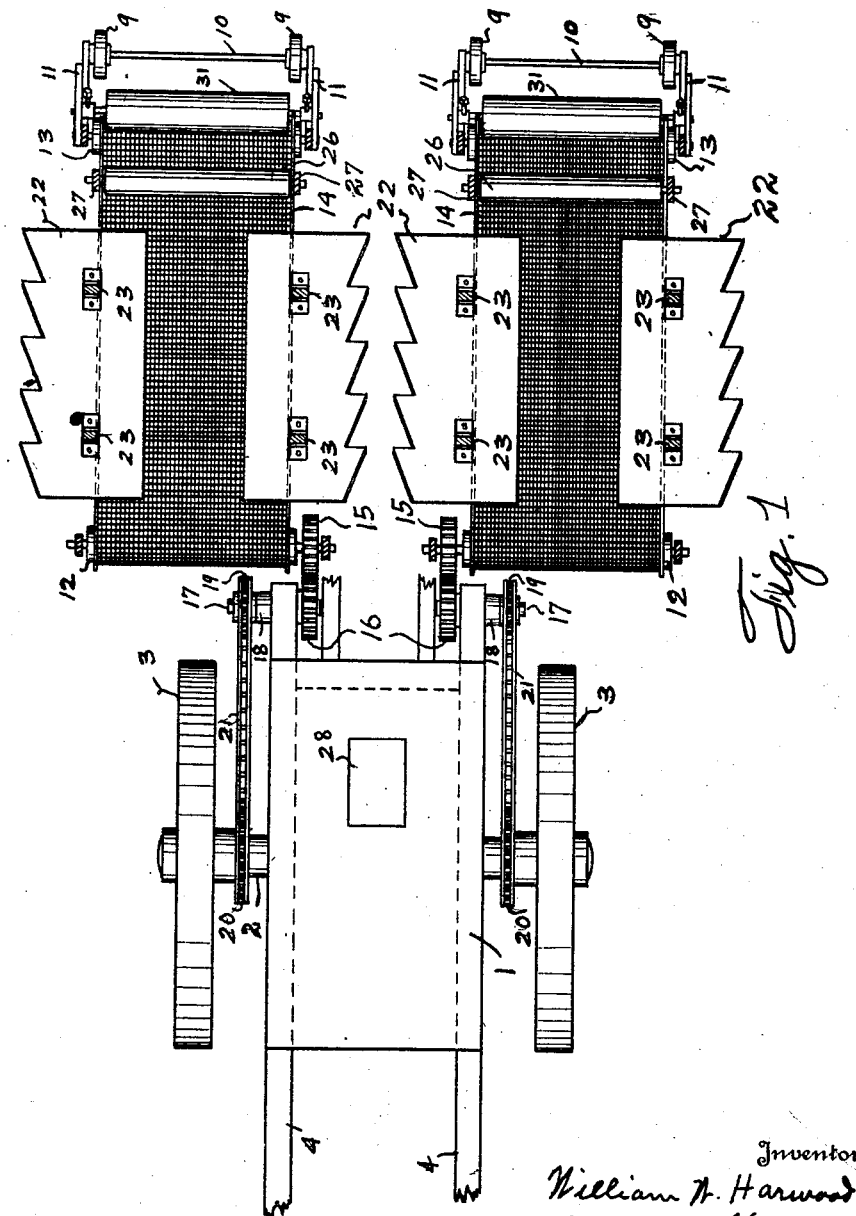

April 12, 1927.
W. W. HARWOOD ET AL
1,624,240
INSECT DESTROYER
Filed May 22, 1925
2 Sheets-Sheet 2
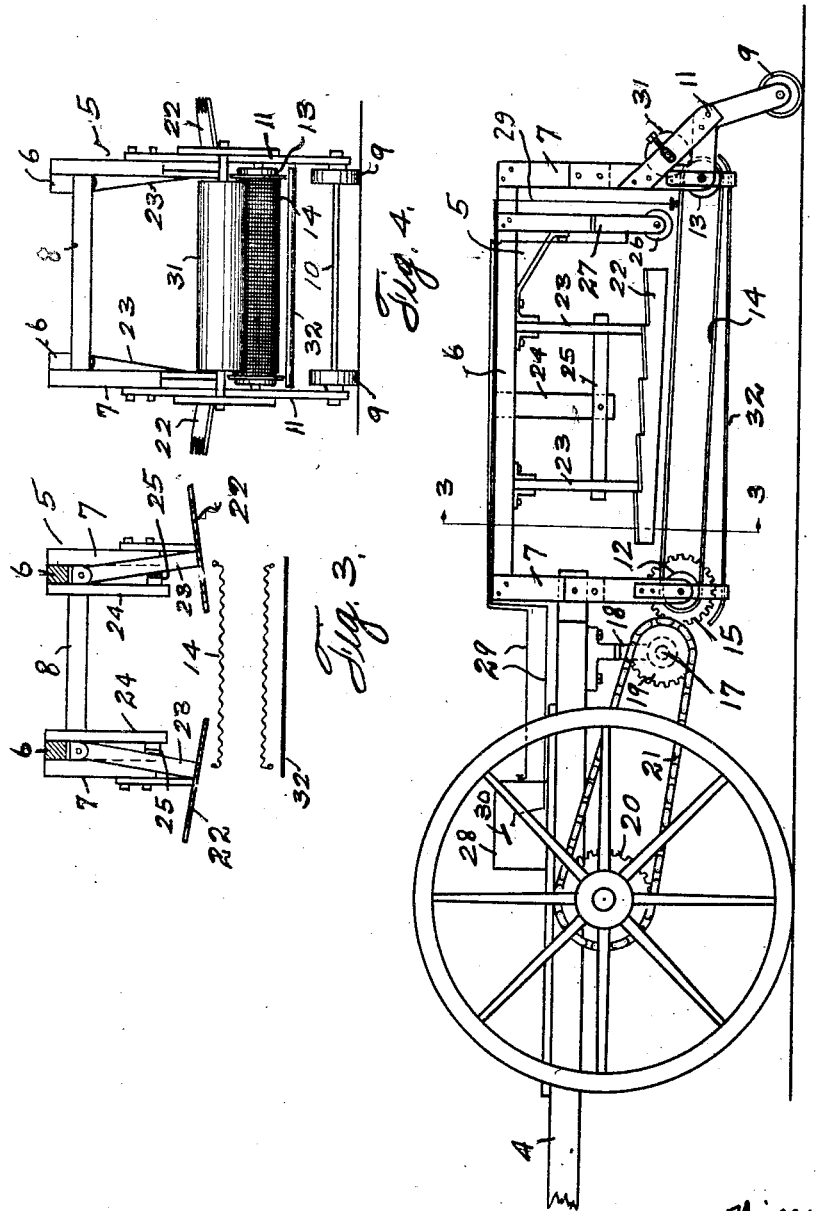

Patented Apr. 12, 1927.

1,624,240

UNITED STATES PATENT OFFICE.

WILLIAM W. HARWOOD, OF GRANNIS, ARKANSAS, AND GEORGE HARWOOD, OF DICKINSON, TEXAS.

INSECT DESTROYER.

Application filed May 22, 1925. Serial No. 32,068.

This invention relates to new and useful improvements in an insect destroyer.

One object of the invention is to provide a device of the character described specially designed for the purpose of destroying boll weevil, and similar insects, by the process of electrocution, and provision is also made for killing said insects by mechanical means.

With the above and other objects in view this invention has particular relation to certain novel features of construction, operation and arrangement of parts, an example of which is given in this specification, and illustrated in the accompanying drawings, wherein:

Figure 1 shows a plan view of the device partly in section.

Figure 2 shows a side view thereof.

Figure 3 shows sectional view taken on the line 3—3 of Figure 2 and,

Figure 4 shows a fragmentary rear view.

Referring now more particularly to the drawings, wherein like numerals of reference designate similar parts in each of the figures, the numeral 1 designates the implement body which is mounted on the axle 2, which in turn, is supported by the wheels 3. Draft thills 4, are provided for the hitching of the draft animal to the implement.

Attached to the body and extending rearwardly are the frames 5, 5, arranged side by side. Only one of these frames are shown, but more may be used, so as to take care of several rows of cotton, at one time, if found practical. These frames are composed of suitable side members 6, 6, and end members 7, 7, and the connecting cross bars 8, 8. The rear ends of these frames are supported on the wheels 9, 9, which are fixed on the shafts 10 whose ends are journaled in the lower ends of the depending arms 11, 11 fixed to the respective sides of the rear ends of the frames 5.

Each frame has the front and rear drums 12 and 13, which are fixed on suitable shafts whose ends are journaled in the lower ends of the respective end members 7.

Operating over these drums 12 and 13 of the respective frames, are the endless belts, or aprons 14, 14, preferably formed of wire mesh. The inner ends of the shafts of the drums 12 have the spur gears 15, 15, fixed thereon and in mesh with similar gears 16, 16 which are fixed on the inner ends of the short shafts 17, 17. These shafts 17 are rotatable in bearings 18 which depend from the rear end of the body 1 and fixed on the outer ends of said shafts are the sprockets 19, which are aligned with similar sprockets 20, which are fixed on the axle 2. Operating over the respective sprockets 19 and 20, on each side are the sprocket chains 21, 21 which transmit rotation from the latter to the former, and thereby drive the aprons 14.

In use the implement is driven along over the row of plants so that the aprons 14 will pass on opposite sides of the row. There are the oppositely disposed, downwardly converging, or declining, agitating plates 22, 22. Each plate is fixed to the lower ends of the swing arms 23, 23, whose upper ends are pivoted to the respective side member 6, 6. Depending from each of said side member there is a fixed anchor 24, and secured to the lower end of each anchor there is a long flat spring 25, whose ends are free and rest against the inner sides of the corresponding arms 23, 23.

It is clear that as the implement passes along the row, the adjacent plates 22, will pass on opposite sides of the row, and the outer edges of these plates are suitably serrated, as shown, so that, as they contact with the plants they will agitate them and knock off the insects, and yet the plates will yield, somewhat so as not to break or injure the plants.

The insects will fall onto said plates 22 and will pass thence onto the corresponding aprons 14 and will be carried underneath the rollers 26 which are suspended by the hangers 27, 27, from the side members 6. These rollers are spaced from said aprons only a sufficient distance to permit the insects to pass, but contact with the insects as they pass thereunder. The rollers 26 and the aprons 14 are connected with the battery 28, through the wiring 29, which is equipped with the usual switch 30. The current is completed through the insects on the aprons and they are thereby electrocuted.

In the rear of each roller 26 there is a crushing roller 31, the ends of whose shafts are journalled in the arms 11. These rollers 31 are in rolling contact with the belts 14 and crush and destroy any insects that may escape electrocution. The belts are protected underneath by means of the flat, hood-like shields 32 which are hung from the respective end members.

What we claim is:

1. An insect destroyer including a carriage, a revolving electro-conducting apron carried thereby, a contact member spaced from said apron, and means for connecting said apron and said contact member to the opposite poles of a source of electricity.

2. An insect destroyer including a carriage, an endless revolving electro-conducting apron carried thereby, a contact roller spaced from said apron and means for connecting said apron and said roller to the opposite poles of a source of electricity.

3. An insect destroyer including a carriage, a frame attached to the carriage, a ground runner supporting the frame, an endless belt-like electro-conducting apron revolvably mounted in the frame, means for revolving the apron, a contact member spaced from said apron, means for connecting said apron and said contact member to the opposite poles of a source of electricity.

4. An insect destroyer including a carriage, a frame attached to the carriage, a ground runner supporting the frame, an endless belt-like electro-conducting apron revolvably mounted in the frame, means for revolving the apron, a contact member spaced from said apron, means for connecting said apron and said contact member to the opposite poles of a source of electricity and an agitating plate arranged above and declining toward said apron.

In testimony whereof we have signed our names to this specification.

WILLIAM W. HARWOOD.
GEORGE HARWOOD.